United States Patent Office — 3,743,686, Patented July 3, 1973

3,743,686
UNSATURATED POLYESTER RESINS WHICH CURE IN THE PRESENCE OF WATER AND WHICH CONTAIN AT LEAST ONE DEHYDRO MONOMER
Stanley D. Koch, Beachwood, and Arthur H. Gerber, University Heights, Ohio, assignors to Horizons Incorporated, a Division of Horizons Research Incorporated, Cleveland, Ohio
No Drawing. Filed June 18, 1971, Ser. No. 154,657
Int. Cl. C08f 11/02, 21/02, 43/02
U.S. Cl. 260—861       14 Claims

ABSTRACT OF THE DISCLOSURE

A process for the strengthening, sealing, or joining of solid surfaces in the presence of moisture by means of unsaturated polyester resin composition containing dehydro monomers; and the unsaturated polyester resin compositions and dehydro monomers required therefor.

---

The principal object of this invention is to provide new compositions which are unsaturated polyester resin systems which will cure at room temperature and at moderate temperatures even in the presence of water.

The term "polyester resin" will be used only to refer to the thinned resin system made up of an unsaturated polyester resin diluted with styrene or a homolog, or diluted partly with styrene and partly with another unsaturated material, such as an acrylate.

The advantages of polyester resins are that they are reasonably inexpensive, with reinforcement they form structures of excellent strength, and they can be cured in place quickly at room temperature without heating or elaborate equipment.

It would be very desirable and practical to use polyester resin systems with suitable reinforcement for various in situ applications in the field: for example, in building roads and aircraft runways, and in reinforcing mine walls. This is not possible with the polyester resin systems presently known to the art because the curing systems usually used for room-temperature cure are completely inhibited by water. Since the outdoor environment of roads and aircraft runways is wet by natural water at least some of the time, such a use of polyester resin systems is impossible except on certain dry days. Wall surfaces in mines, such as coal mines, which could benefit from the inexpensive and strong reinforcement provided by polyester resin systems, are almost continuously damp, wet, or covered with a film of flowing water.

An additional disadvantage to the use of known polyester resin systems in coal mines is the volatility of the styrene diluent, often present to the extent of 40% by weight. This poses a fire, and to some extent inhalation, hazard.

A brief description of polyester resin systems will be given.

The polyester itself is a simple condensation polymer of a glycol(s) and two or more diacids, cooked under inert gas to an acid number of 0 to 40. Propylene glycol is a commonly-used glycol. Diacids or anhydrides used always include at least one which is saturated, such as phthalic, isophthalic, or adipic, and one which is unsaturated, such as maleic or fumaric. Fumaric copolymerizes better with styrene, but maleic is cheaper, easier to use, and is largely isomerized to fumarate at the high temperature of polyesterification. The polyester is protected from gelation during esterification by an inhibitor, such as hydroquinone, or a homolog.

On completion of the polyesterification cook, the polyester may be cooled to a brittle glass, pulverized, and stored for later mixing with a reactive comonomer (usually referred to as "monomer"). Often, the hot polyester is allowed to cool to the lowest temperature at which it retains a convenient viscosity for mixing and the monomer added. The monomer is usually styrene. Styrene derivatives such as chlorostyrene and vinyltoluene, and other unsaturated compounds, such as acrylates, are also used.

For use with a room temperature cure, the thinned resin is mixed with a catalyst, such as methyl ethyl ketone peroxide, and an accelerator, such as cobalt naphthenate or dimethylaniline. After catalysis and acceleration, the mixture has a limited pot life and must be used promptly or discarded.

Inhibition of room temperature cures by water, particularly in the methyl eehyl ketone peroxide catalyst/cobalt soap accelerator system, has been widely noted.

The optimum properties of polyesters accelerated by cobalt soaps are affected by any water present. The addition of higher levels of catalyst does not improve the ultimate cure of the resin.

We have overcome this inhibition with new ingredients, called the "dehydro monomers," for polyester resin formulation which react with water to consume it and generate acrylate comonomers. Acrylate comonomers have frequently been used with styrene to make resins which cure to give better resistance of the final, cured polymer to moisture and weathering. Replacement of a portion of the styrene in the resin system has the additional advantage of reducing the fire and inhalation hazards as the additives have much lower vapor pressure than the styrene they displace.

All of the dehydro monomers enumerated herein will react rapidly or instantaneously with water at ambient temperature to form a useful acrylate monomer and, sometimes with a boric oxide, or acid, as the only products of the hydrolysis.

Several classes of dehydro monomers have been found useful: unsaturated anhydrides, mixed anhydrides, mixed anhydrides of unsaturated carboxylic acids and boron or silicon acids, and borate esters.

Acrylic (I) and methacrylic (II) anhydrides

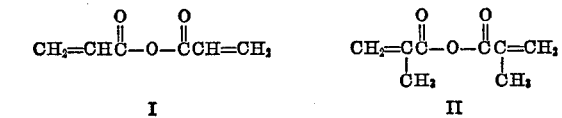

are colorless, mobile liquids which are commercially available.

The first mixed anhydride of a carboxylic acid and boric acid was prepared in 1903 by Pictet and Geleznow from acetic anhydride by heating:

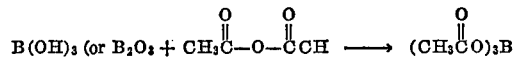

The product was variously called boron triacetate or triacetyl borate. The reaction was readily applicable to other carboxylic acids, although use of acrylic or methacrylic anhydride has never been reported. The products are organic-soluble and instantaneously hydrolyzable to the parent acids.

Much later it was found that the products formed by heating to such temperatures were not orthoborates, but pyroborates.

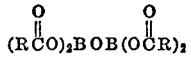

Use of a Lewis acid catalyst, such as zinc chloride, allows the reaction to take place at a lower temperature and permits the formation of the orthoborate (RCOO)$_3$B.

The latter is preferred for this application as it provides a higher proportion by weight of useful carboxylic acid on hydrolysis.

We have prepared the trianhydrides of orthoboric acid with acrylic and methacrylic acids (III and IV, respectively) by the method of Ya. Ya. Markarov-Zemlyanskii and V. V. Malyakavin, Nauchn. Tr. Mosk. Tekhnol. Inst. Legkoi Prom. 1962 (24), 46; Chem. Abstr. 60, 403d (1964).

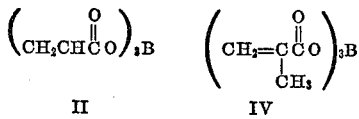

III     IV

They are new compounds.

Although it was thought that it might be desirable to moderate the reactivity of the trianhydrides with saturated acid groups to make compounds like

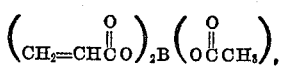

it was found to be impractical, since the unsymmetrical anhydrides of mixed carboxylic acids disproportionate to the two symmetrical anhydrides:

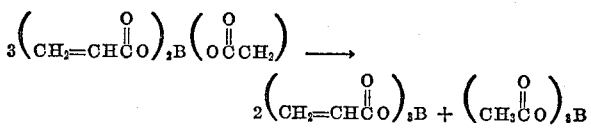

The corresponding tetraanhydrides of pyroboric acid with acrylic and methacrylic acids (V and VI, respectively)

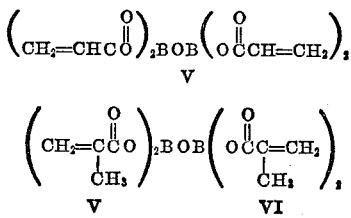

V     VI are also useful in the practice of this invention. They are also new compounds. They are as easily prepared as the orthoborates.

The borate esters, (RO)$_3$B, also hydrolyze quite readily at ambient temperatures where R is an unsaturated group.

The simplest unsaturated borate esters are allyl (VII) and methallyl (VIII).

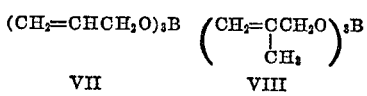

VII     VIII

These esters have been simply prepared by reaction of the unsaturated alcohol with boric oxide, boric acid, or methyl or ethyl borate. Triallyl borate is commercially available.

An example of a diunsaturated alcohol which could be used for a borate ester is sorbyl alcohol.

Good acrylate monomers can also be generated from the borate esters of the glycol monoesters of acrylic acids and the corresponding amides. These monomers have the formula

where R$_1$ is an unsaturated monovalent organic radical of less than seven carbon atoms, R$_2$ and R$_3$ may be hydrogen or an alkyl group of 1 to 4 carbon atoms, and Q is a divalent radical selected from the group comprising oxygen and imino. Five representative borate esters of this group are IX to XIII:

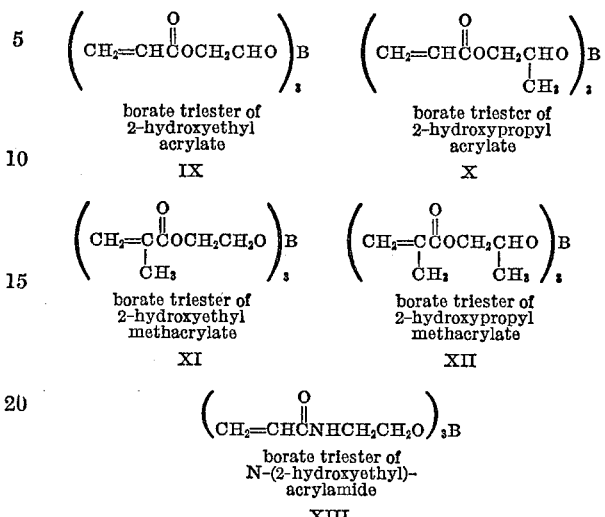

borate triester of 2-hydroxyethyl acrylate
IX borate triester of 2-hydroxypropyl acrylate
X borate triester of 2-hydroxyethyl methacrylate
XI borate triester of 2-hydroxypropyl methacrylate
XII

borate triester of N-(2-hydroxyethyl)- acrylamide
XIII

The five materials IX to XIII are new compounds. Obviously mixed borate triesters of hydroxyalkyl acrylates and substituted acrylates are also suitable.

Useful as dehydro monomers for this application are the mixed anhydrides of orthosilicic acid and unsaturated carboxylic acids of the formula:

$$(R_4)_x Si(OCOR_1)_{4-x}$$

where R$_1$ is an unsaturated monovalent organic radical of less than seven carbon atoms, R$_4$ is an alkyl group of les than five carbon atoms and preferably methyl, and $x$ is an integer chosen from the group comprising 0, 1, and 2.

Polyester resin compositions containing the dehydro monomers of this invention are useful for forming hard, cured coatings on moist surfaces of rock, shale, concrete, soil, sand, and the like. They can be used to provide adhesion, as between two lengths of cylindrical pipe, and to strengthen and waterproof porous surfaces.

The following examples are illustrative of preferred embodiments of this invention and are not to be construed as limiting the invention in any way.

EXAMPLE 1

Boric acid, 6.18 g., was added to 40.32 g. acrylic anhydride, 4 mg. of anhydrous zinc chloride, and 20 mg. of hydroquinone at such a rate that the temperature of the mixture was 20 to 70° C. After cooling, 30 ml. of ether was added and the mixed trianhydride of orthoboric acid and acrylic acid was filtered off. The yield was 90%. Calculated for C$_9$H$_9$BO$_6$ (percent): C, 48.2; H, 4.0; B, 4.8. Found (percent): C, 48.0; H, 4.0; B, 4.5.

EXAMPLES 2–3

When the procedure of Example 1 was repeated using each of the following anhydrides in place of acrylic anhydride, the corresponding mixed trianhydrides of orthoboric acid were obtained:

(2) methacrylic anhydride
(3) ethacrylic anhydride

EXAMPLE 4

Orthoboric acid, 6.0 g., and 30 mg. of hydroquinone in 25 ml. of acrylic acid and 53 ml. of acrylic anhydride were heated 25 minutes at 50 to 70° C. and the cooled solution diluted with ether. The solid was recrystallized from benzene/acrylic acid to give colorless needles of the mixed tetraanhydride of pyroboric acid and acrylic acid.

Calculated for $C_{12}H_{12}B_2O_9$ (percent): C, 42.6; H, 4.7; B, 8.3. Found (percent): C, 42.3; H, 4.6; B, 8.4.

EXAMPLE 5

When the procedure of Example 4 was repeated using methacrylic acid and methacrylic anhydride in place of acrylic acid and acrylic anhydride, the corresponding mixed tetraanhydride of pyroboric acid and methacrylic acid was obtained.

EXAMPLE 6

In a round-bottomed flask fitted with a distillation column, 104 g. of trimethyl borate, 464 g. of 2-hydroxyethyl acrylate, and 0.35 g. of t-butylcatechol were heated at reflux. When the temperature exceeded 85° C. the bath temperature was maintained at 85° C. until the calculated three moles of methanol were removed by distillation. Excess 2-hydroxyethyl acrylate and the desired borate triester of 2-hydroxyethyl acrylate were fractionally distilled over at reduced pressure. The latter was obtained as a clear liquid. Calculated for $C_{15}H_{21}BO_9$ (percent): C, 50.1; H, 5.9; B, 3.0. Found (percent): C, 50.1; H, 5.6; B, 3.1. The same product was obtained by the direct esterification of orthoboric acid and 2-hydroxyethyl acrylate.

EXAMPLE 7

When the procedure of Example 6 was followed, using a 1:4 mole ratio of triethyl borate and 2-hydroxypropylacrylate, and heating to 90° C. before reducing the pressure, the borate triester of 2-hydroxypropyl acrylate was obtained. Calculated for $C_{18}H_{27}BO_9$ (percent): C, 54.3; H, 6.8; B, 2.7. Found (percent): C, 54.1; H, 6.7; B, 2.8.

EXAMPLE 8

When the procedure of Example 6 was followed, using a 1:4 mole ratio of trimethyl borate and 2-hydroxyethyl methacrylate, the borate triester of 2-hydroxyethyl methacrylate was obtained. Calculated for $C_{18}H_{27}BO_9$ (percent): C, 54.3; H, 6.8; B, 2.7. Found (percent): C, 54.3; H, 6.4; B, 2.5.

EXAMPLE 9

When the procedure of Example 6 was followed, using a 1:4 mole ratio of trimethyl borate and 2-hydroxypropyl methacrylate, the borate triester of 2-hydroxypropyl methacrylate was obtained.

EXAMPLE 10

When the procedure of Example 6 was followed, using a 1:4 mole ratio of trimethyl borate and N-(2-hydroxyethyl)acrylamide and isolating the product by recrystallization of the residue obtained by heating the reaction mixtures to 85° C. at 100 mm. pressure, the borate triester of N-(2-hydroxyethyl)acrylamide was obtained.

EXAMPLE 11

A polyester resin masterbatch was made from 60 parts by weight of the hydroquinone-inhibited polyester of propylene glycol esterified with equimolar quantities of maleic and phthalic anhydrides cooked to an acid number of 30 to 40, and 15 parts by weight of styrene.

When, as a control experiment, 25 parts by weight of additional styrene and 3 parts by weight of water were added to the masterbatch and the mixture catalyzed and accelerated in the usual way known to those skilled in the art, SPI gel time exceeded one hour and no satisfactory room temperature cure could be obtained.

EXAMPLE 12

A polyester resin was made from 75 parts by weight of the masterbatch of Example 11, 5 parts by weight styrene, 21 parts by weight of acrylic anhydride, and 3 parts of water. After catalysis and acceleration the resin showed an SPI gel time of 6 minutes and 15 seconds and gave a room temperature cure with satisfactory hardness.

EXAMPLES 13 TO 23

As shown in the table below, additional polyester resin compositions were made up from the masterbatch of Example 11 and various dehydro monomers. Water and other ingredients as indicated were added and the resins catalyzed and accelerated. The resulting SPI gel times are indicated.

| Example number | 13 | 14 | 15 | 16 | 17 | 18 | 19 | 20 | 21 | 22 | 23 |
|---|---|---|---|---|---|---|---|---|---|---|---|
| Recipe, parts by weight: | | | | | | | | | | | |
| Masterbatch of Example 11 | 75 | 75 | 75 | 75 | 75 | 75 | 75 | 75 | 75 | 75 | 75 |
| Styrene | 12 | 4 | 8 | 15 | 14 | | 15 | 14 | 11 | 16 | 13 |
| Methyl methacrylate | | 5 | 5 | 5 | | 10 | | | | | |
| Water | 3 | 3 | 3 | 1 | 2 | 2 | 2 | 3 | 2 | 2 | 2 |
| Dehydro monomer | 13 | 16 | 12 | 5 | 16 | 15 | 10 | 11 | 14 | 9 | 12 |
| Dehydro monomer of Example number | (1) | (2) | (4) | (4) | (6) | (8) | (8) | (1) | (10) | (2) | (3) |
| SPI gel time, min.:sec | 6:30 | 5:05 | 23:20 | 6:00 | 6:50 | 5:15 | 38:10 | 9:45 | 7:20 | 6:45 | 8:00 |

¹ Dehydro monomer for Example 20 was triallyl borate.
² Dehydro monomer for Example 22 was the mixed tetraanhydride of orthosilicic acid and acrylic acid.
³ Dehydro monomer for Example 23 was the mixed dianhydride of dimethylsilanediol and methacrylic acid.

What is claimed is:

1. In an unsaturated polyester resin composition comprising:
   (A) 40 to 75% of an unsaturated polyester which is a simple condensation product of glycols and at least two diacids
   (B) 10 to 55% of a monomer selected from the group consisting of styrene, alkyl substituted styrenes, halo substituted styrenes, acrylates, methacrylates and allyl cyanuric esters, and the improvement which comprises the combination therewith of:
   (C) 1 to 30% of one or more compounds which are capable of reacting with water at room temperature to generate as a product of hydrolysis at least one compound which will copolymerize with components (A) and (B) said compound being selected from the group consisting of anhydrides of unsaturated monocarboxylic acids of less than 7 carbon atoms; mixed trianhydrides of orthoboric acid and unsaturated monocarboxylic acids of less than 7 carbon atoms; mixed tetraanhydrides of pyroboric acid and unsaturated monocarboxylic acids of less than 7 carbon atoms; borate triesters of the formula

where $R_1$ is an unsaturated monovalent organic radical of less than 7 carbon atoms, $R_2$ and $R_3$ are each chosen from the group comprising hydrogen and alkyl groups of 1 to 4 carbon atoms, Q is a divalent radical chosen from the group comprising oxygen and imino, and $n$ is chosen from the group comprising zero and one; and mixed anhydrides of the formula:

where $R_1$ is an unsaturated monovalent organic radical of less than 7 carbon atoms, $R_4$ is an alkyl group of less than 5 carbon atoms, and $x$ is an integer from the group comprising 0, 1, and 2.

2. The resin composition of claim 1 where the component (C) is 1 to 30% of one or more anhydrides or mixed anhydrides of unsaturated monocarboxylic acids of less than seven carbon atoms.

3. The resin composition of claim 2 where the anhydride (C) is either acrylic anhydride or methacrylic anhydride.

4. An unsaturated polyester resin composition comprising components (A) and (B) as defined in claim 1 and including, in addition thereto:
(D) 1 to 30% of one or more readily hydrolyzable derivatives of boron acid selected from the group consisting of mixed trianhydrides of orthoboric acid and unsaturated monocarboxylic acids of less than 7 carbon atoms; and mixed tetraanhydrides of pyroboric acid and unsaturated monocarboxylic acids of less than 7 carbon atoms.

5. The resin composition of claim 4 where the boron acid derivative (D) is one or more of the mixed trianhydrides of orthoboric acid and unsaturated monocarboxylic acids of less than seven carbon atoms.

6. The resin composition of claim 5 where the mixed trianhydride (D) is 1 to 30% of the mixed trianhydride of orthoboric acid and an unsaturated acid chosen from the group comprising acrylic and methacrylic acids.

7. An unsaturated polyester resin composition comprising components (A) and (B) as defined in claim 1 and including in addition thereto:
(E) 1 to 30% of at least one mixed tetraanhydride of pyroboric acid and unsaturated monocarboxylic acids of less than seven carbon atoms.

8. The resin composition of claim 7 where the mixed tetraanhydride (E) is 1 to 30% of the mixed tetraanhydride of pyroboric acid and an unsaturated acid chosen from the group comprising acrylic and methacrylic acids.

9. An unsaturated polyester resin composition comprising components (A) and (B) as defined in claim 1 and including in addition thereto:
(F) 1 to 30% of at least one borate triester of the formula

where $R_1$ is an unsaturated monovalent organic radical of less than seven carbon atoms, $R_2$ and $R_3$ are each chosen from the group comprising hydrogen and alkyl groups of 1 to 4 carbon atoms, Q is a divalent radical chosen from the group comprising oxygen and imino, and $n$ is chosen from the group comprising zero and one.

10. The resin composition of claim 9 where $R_1$ is chosen from the group comprising allyl and methallyl, and $n$ is zero.

11. The resin composition of claim 9 where $R_1$ is chosen from the group comprising vinyl and isopropenyl, $R_2$ is hydrogen, $R_3$ is chosen from the group comprising hydrogen and methyl, Q is oxygen, and $n$ is one.

12. The resin composition of claim 9 where $R_1$ is vinyl or isopropenyl, $R_2$ is hydrogen, $R_3$ is chosen from the group comprising hydrogen and methyl, Q is imino, and $n$ is one.

13. An unsaturated polyester resin composition comprising components (A) and (B) as defined in claim 1 and including in addition thereto:
(G) 1 to 30% of at least one mixed anhydride of the formula:

$$(R_4)_x Si(OCOR_1)_{4-x}$$

where $R_1$ is an unsaturated monovalent radical of less than seven carbon atoms, $R_4$ is an alkyl group of less than five carbon atoms, and $x$ is an integer chosen from the group comprising 0, 1, and 2.

14. The resin composition of claim 13 where $R_1$ is chosen from the group comprising vinyl or isopropenyl and $R_4$ is methyl.

References Cited
UNITED STATES PATENTS

| | | | |
|---|---|---|---|
| 3,299,173 | 1/1967 | Roselli | 260—462 R |
| 3,169,947 | 2/1965 | Stroh et al. | 260—865 |
| 3,214,449 | 10/1965 | Kirshenbaum. | |
| 2,941,000 | 6/1960 | May et al. | 260—545 |
| 3,221,081 | 11/1965 | Sarrachin | 260—864 |
| 3,267,177 | 8/1966 | Howald et al. | 260—865 |

WILLIAM H. SHORT, Primary Examiner

E. WOODBERRY, Assistant Examiner

U.S. Cl. X.R.

260—462 A, R, 545 R, 870

UNITED STATES PATENT OFFICE
CERTIFICATE OF CORRECTION

Patent No. 3,743,686      Dated July 3, 1973

Inventor(s) Stanley D. Koch and Arthur H. Gerber

It is certified that error appears in the above-identified patent and that said Letters Patent are hereby corrected as shown below:

Column 2, line 16; change "eehyl" to --ethyl--

Column 2, line 55; after "(or $B_2O_3$"-complete the parenthesis

Column 3, line 6; correct --Makarov-Zemylanskii--

Column 3, lines 10-13 correct the formula to read--

$$(CH_2=CH\overset{O}{\overset{\|}{C}}O)_3B$$ --

Column 3, line 14; change "II" to --III--

Column 3, line 40; correct the formula to read--

$$(CH_2=CH\overset{O}{\overset{\|}{C}}O)_2BOB(O\overset{O}{\overset{\|}{C}}CH=CH_2)_2$$

Column 4, line 35; change "les" to --less--

Column 5, line 63; change "mixtures" to --mixture--

Column 8, line 34; after "Kirshenbaum" add --260-406--

Signed and sealed this 27th day of November 1973.

(SEAL)
Attest:

EDWARD M. FLETCHER, JR.
Attesting Officer

RENE D. TEGTMEYER
Acting Commissioner of Patents